Sept. 26, 1933.  W. H. SILVER  1,928,318
LISTER CULTIVATOR
Filed Oct. 24, 1927  3 Sheets-Sheet 2
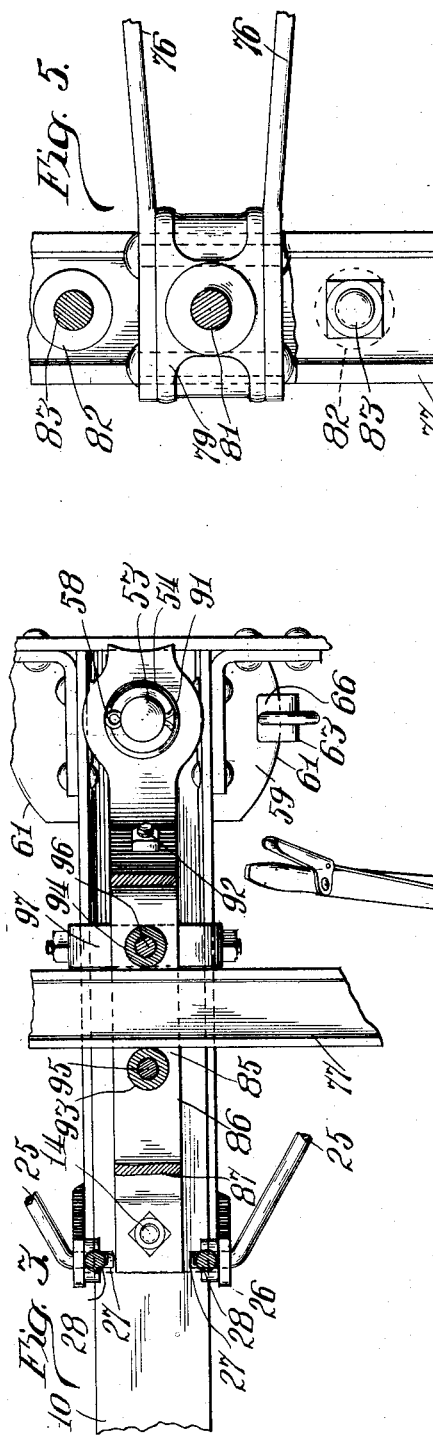
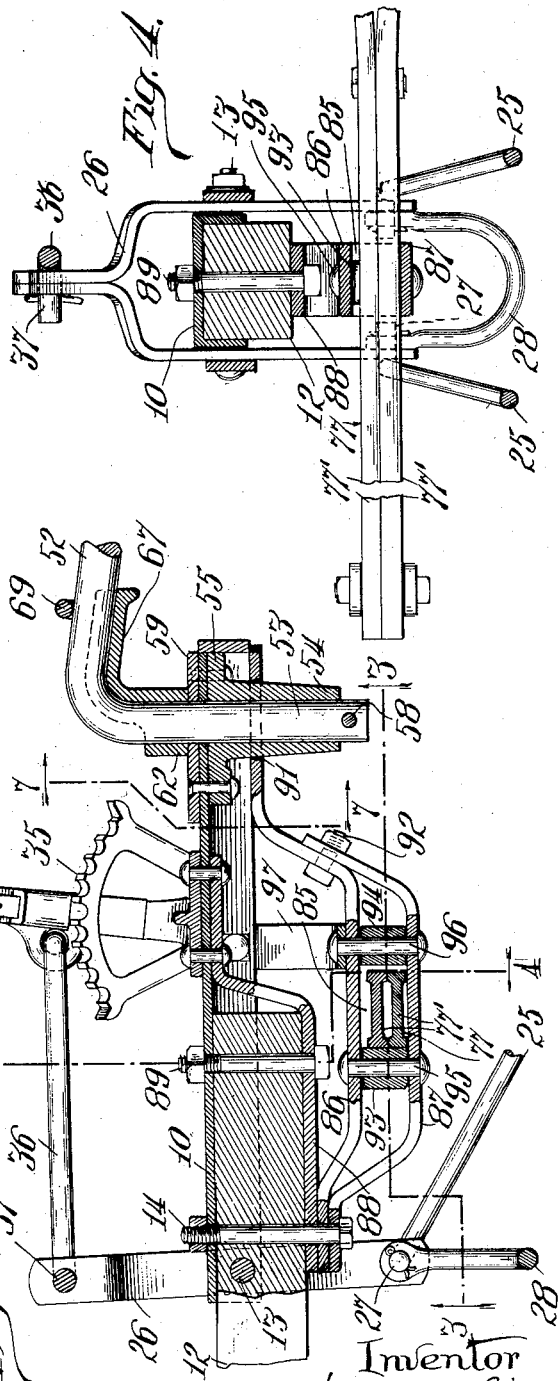

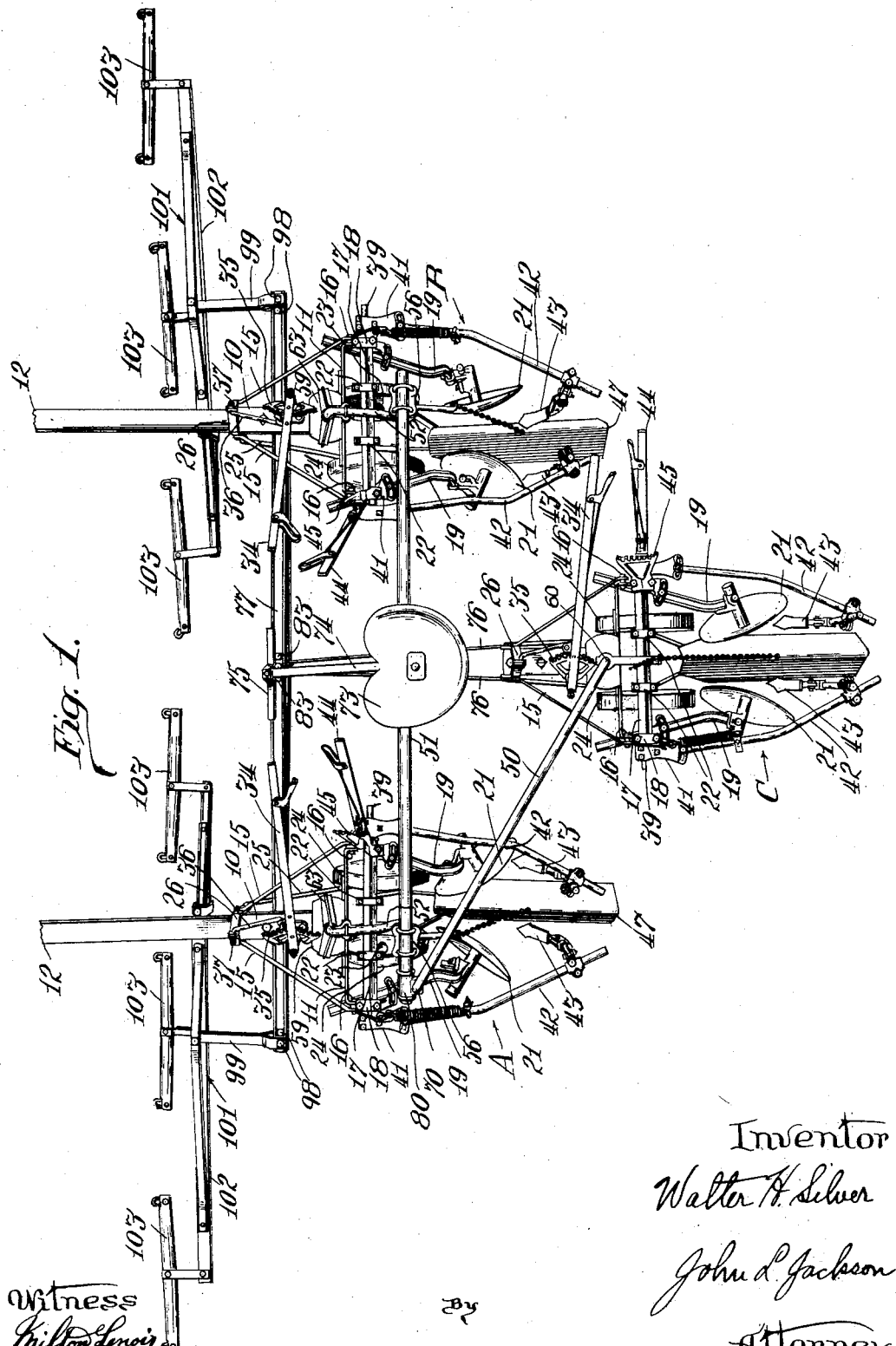

Sept. 26, 1933.  W. H. SILVER  1,928,318
LISTER CULTIVATOR
Filed Oct. 24, 1927  3 Sheets-Sheet 3
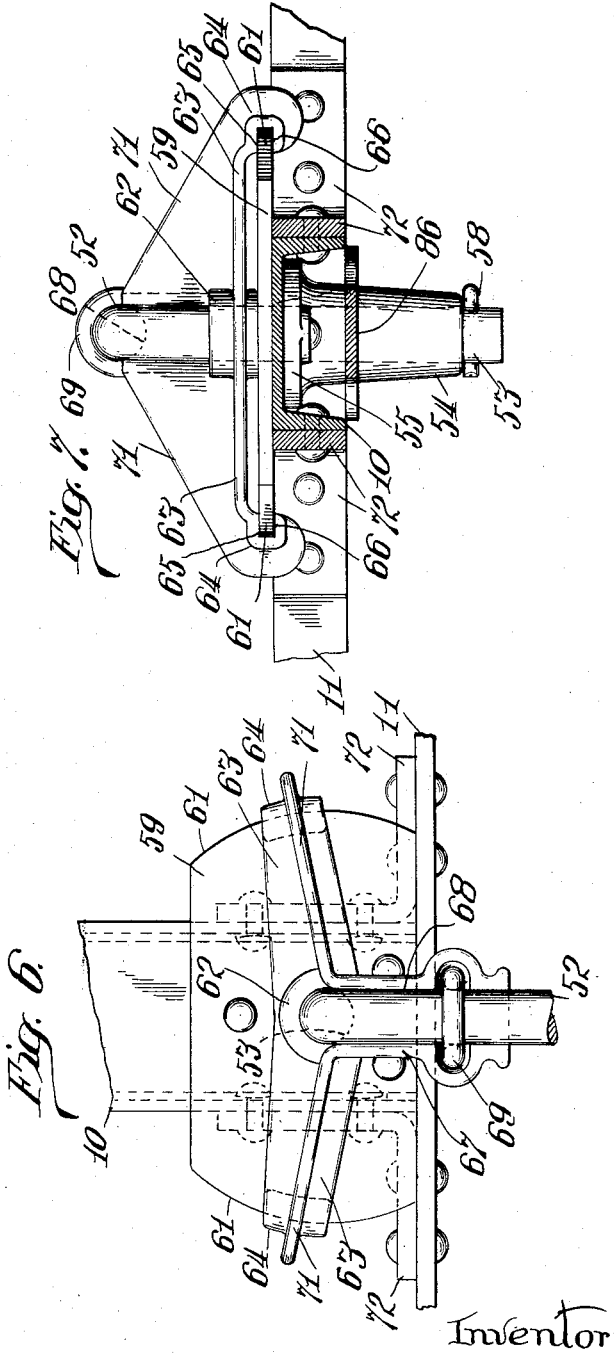
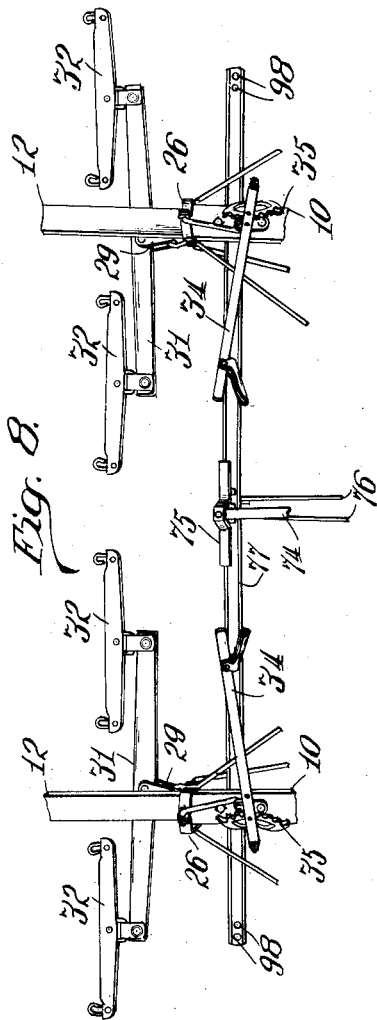
Inventor
Walter H. Silver
John L. Jackson
By
Attorney Patented Sept. 26, 1933

1,928,318

UNITED STATES PATENT OFFICE 1,928,318

LISTER CULTIVATOR

Walter H. Silver, Moline, Ill., assignor to Deere & Company, Moline, Ill., a corporation of Illinois Application October 24, 1927. Serial No. 228,118

19 Claims. (Cl. 97—143)

The present invention relates to lister cultivators of the multiple-row type.

One of the principal objects of the invention is to provide a cultivator of this general type which can be readily adapted alternatively to either four-horse or six-horse draft. Such feature is of considerable advantage in that it enables one standard size of implement to be sold either as a four-horse or six-horse implement, and it also enables the farmer to convert the implement readily into either a four or six-horse device in accordance with different soil conditions or the number of head of horses available. In converting the implement from a four-horse to a six-horse implement, or vice versa, it is of course important that the horses be so spaced that all will walk on the ridges rather than in the listed plant rows, and one of the features of the invention is concerned with the manner in which this is obtained. Another feature of the invention resides in the manner in which the draft of the different cultivator gangs is equally distributed irrespective of whether the implement is connected for a four or six-horse hitch.

In a co-pending application filed by myself, Theophilus Brown, and Carl G. Strandlund, which application is identified as Serial No. 228,142, filed October 24, 1927, we have disclosed a three-row lister cultivator which includes among other features: The arrangement of the three cultivator gangs so that each can shift laterally independently of each other in order that the gangs can accurately follow the lateral deviations in the plant rows; the disposal of the three cultivator gangs in staggered relation to prevent the gangs interfering or colliding with each other in their laterally deviating travel, or in the turning of the implement at the ends of the field; and the provision of improved stabilizing means for preventing lateral tipping of any of the gangs.

The present invention has been devised primarily for embodiment in an implement having the above characteristic features, so that such implement can be readily converted from a four to a six horse hitch, or vice versa. However, in its broader aspect, the invention has application to other types of lister cultivators, and even to those of the two-row type.

Another object of the invention is to provide an improved construction of bearing for establishing the pivotal connection between each outer gang and its associated stabilizing link or arm. Such link or arm resists the tendency of the cultivator gang to tip laterally, and the present bearing affords bearing points of wide radial spacing for better resisting this tipping tendency.

Other objects and advantages of the invention will appear at length in the following description of a preferred embodiment thereof. In the drawings illustrating such embodiment:

Fig. 1 is a plan view in perspective of the implement, showing the draft mechanism arranged for a six-horse draft of the implement;

Fig. 2 is a longitudinal sectional view through the front end of one of the outer gangs;

Fig. 3 is a horizontal sectional view taken on the plane of the line 3—3 of Fig. 2, and looking upwards;

Fig. 4 is a transverse sectional view taken on the plane of the line 4—4 of Fig. 2;

Fig. 5 is a detail sectional view illustrating the draft connection between the transverse draft bar and the intermediate cultivator unit;

Fig. 6 is a detail plan view illustrating the bearing which connects each outer gang with its stabilizing arm or link;

Fig. 7 is a sectional view of the same, corresponding to a section taken on the plane of the line 7—7 of Fig. 2; and Fig. 8 is a fragmentary plan view showing the draft mechanism converted into a four-horse hitch.

The implement comprises three lister cultivator gangs, the two outwardly-disposed gangs being designated A and B, and the intermediate or center gang being designated C. The two laterally-disposed gangs A and B are substantial duplicates, with the exception that one is a left hand unit and the other a right hand unit. The intermediate gang C is similar in construction to the two outer gangs A and B, only differing therefrom in the manner of establishing the draft connection with the intermediate gang, and in the fact that such intermediate gang has no draft pole, as will hereinafter appear. Accordingly, I shall only describe one of these gangs in detail, and in this regard, attention is directed to the fact that these gangs correspond in their general construction to the gangs illustrated in Patent No. 1,148,613, issued to W. A. Paul on August 3, 1915. These gangs also correspond to the construction of gangs or units disclosed in the co-pending application above referred to.

Referring specifically to the gang or unit A, it will be noted that it comprises a frame which is built up of a longitudinally extending channel bar 10 and a transversely extending bar 11 at the rear end thereof. The transverse bar 11 extends across the rear end of the inverted channel bar 10 and is rigidly secured thereto by angle brackets or in any other suitable manner. Extending forwardly from the front end of the channel bar 10 is a draft pole 12, the channel bar 10 forming a socket in which the pole is rigidly secured by a horizontally extending bolt 13 (Fig. 2), which passes through the side flanges of the channel bar and through the tongue, and also by a vertical bolt 14 which passes downwardly through the web of the channel 10 and through the tongue. It will be understood that the other gang unit B also has a draft pole 12 extending forwardly therefrom, which is connected to its channel bar 10 in the same manner. The forementioned frame consisting of the channel bar 10 and transverse bar 11 is braced by diagonally extending brace bars or rods 15 which are connected at their forward ends to the horizontally extending bolt 13. The rear ends of these diagonal brace bars are bent rearwardly and are provided with openings to receive bolts 16 which connect the ends of the bars 11 and 15. The bolts 16 also constitute pivots on which a tool carrying frame is pivotally mounted. Such tool carrying frame comprises primarily a tubular bar 17, preferably of square cross-section. Secured to the opposite ends of such bar are clamp devices or bracket members 18 which are clamped to the outer surface of the bar and which have forwardly extending pivot eyes having pivotal mounting on the bolts 16. Thus the tool carrying bar 17 and the frame 10—11 are capable of vertical pivotal movement relative to each other about the axis of the bolts 16. Pivotally connected to the under sides of the two brackets 18, for horizontal swinging movement, are rearwardly extending arms 19 which carry suitable earth working tools at their rear ends. In the arrangement shown, I have illustrated discs 21 as being mounted on the arms 19, but it will be evident that shovels or any other desired type of earth working devices may be mounted on these arms in lieu of the discs 21. The arms 19 are adapted to be swung inwardly or outwardly to vary the distance between the earth working tools carried thereby, and to be clamped in any adjusted position by a suitable arrangement of clamping bolt engaging in a curved slot in the bracket 18, the details of which need not be described as they are old and well-known. It will also be understood that the earth working tools can be set at different angles with respect to their supporting arms 19.

Secured in spaced relation to the intermediate portion of the tubular bar 17 are two clamping devices 22 from which depend vertical standards 23 (Fig. 1). The lower ends of these two standards have outwardly extending axle spindles upon which are journaled bell wheels 24—24, which straddle the plant row and which support the tool carrying bar 17. Connected to the wheel carrying standards 23, at points preferably adjacent to the outwardly extending spindle portions, are links 25 (best shown in Fig. 2) which extend upwardly and forwardly to a pivoted yoke 26. Such yoke comprises two spaced straps 26 which extend down on the opposite sides of the channel bar 10, being pivotally connected thereto by the bolt 13 which extends through both straps 26. Said straps extend down below the channel bar 10 and have their lower ends apertured to receive the ends of the links 25, such links having inwardly turned ends 27 which project through the apertures in the straps from the outer sides of the straps. Pivotally mounted upon such inwardly turned ends, between the straps 26, is a clevis 28. When the implement is to be drawn by four horses, the whiffletrees at the opposite sides of the implement are pivotally connected to the clevises 28. Referring to Fig. 3, which illustrates the arrangement employed for a four-horse draft, it will be seen that the clevises 28 are linked with secondary clevises 29 which have pivotal connection with the two doubletrees. Each doubletree comprises an evener bar 31, to the outer ends of which singletrees 32 are pivotally connected. It will be noted that when this draft arrangement is employed, the draft pull of each team is transmitted through the clevises 29—28 and through the yoke 26 to the frame bar 10 of each outer gang. It will also be noted that when employing this draft hitch the two horses of each span will be on opposite sides of each pole 12, in position to walk on the ridges between the trenches.

The draft pull which is effective on each clevis 28 is prevented from swinging the yoke 26, through an adjustable locking relation which is established between said yoke and the frame bar 10 of the cultivator gang. Such locking relation is afforded by a lever 34 which is pivotally supported on a suitable pivot bracket mounted on the upper side of the channel bar 10. The lever carries any suitable latch mechanism adapted to cooperate with a latching sector 35, which sector is formed as part of the pivot bracket on which the lever is mounted. A link 36 is pivotally connected to said lever and extends forwardly for effecting pivotal connection at 37 with the upper end of the yoke 26. The upper ends of the two straps which form said yoke are brought together, and the laterally bent end 37 of the link 36 is passed through openings in the upper ends of the straps. It will be evident that by shifting the lever 34 fore and aft the yoke 26 will be rocked on the bolt 13 as a pivot, which will shift the links 25 and thus swing the bell wheels fore and aft about the pivot bolts 16, thereby rocking the tubular frame bar 17 to swing the cultivating devices 21 into or out of engagement with the ground.

Extending through the tubular bar or shaft 17, and rotatable therein, is a second tool carrying shaft 39. Rigidly clamped to the outer ends of the shaft 39 are brackets 41 from which extend bars or arms 42. The rear ends of such arms 42 carry suitable earth working tools 43 which, in the illustrated arrangement, consist of shovels, although it will be evident that any other desired type of cultivating devices may be mounted on these arms. Provision is made for adjusting the two arms 42 of each gang inwardly or outwardly with respect to the plant row, such adjustments being secured by a suitable clamping bolt carried by each arm which effects clamping engagement in a curved slot in the associated bracket 41. These adjustments correspond more or less to the adjustments provided for in the case of the arms 19, and need not be described in detail as they are old and well-known.

The second set of cultivating devices, just described, may be given different depth adjustments relative to the first set of cultivating devices 21 through actuation of a lever 44. This lever is fixedly secured to the tool carrying shaft 39, on which the brackets 41 are mounted, and is adapted to have latched engagement with a notched sector 45 which is illustrated as constituting a part of the inner clamping bracket 18.

As previously described, such clamping bracket is secured fast to the outer tubular shaft or bar 17, and hence the latched engagement of the lever 44 with the sector 45 will hold the two shafts 17 and 39 in fixed relation to each other. It will be seen from the foregoing that when the lever 34 is actuated, the wheel support, comprising the bell wheels 24 and their standards 23, will be shifted fore and aft, and in such movement will raise or lower both sets of cultivating devices 21 and 43, which cultivating devices are carried by the wheel support. It will also be seen that by moving the second lever 44 fore and aft an independent depth adjustment can be given the second set of cultivating devices 43, or these cultivating devices can be raised and lowered for the purpose of shaking trash out of the shovels 43.

Disposed between the two supporting wheels of each gang or cultivator unit is a shield 47 which travels along in the bottom of the trench, over the young plants, so as to prevent the plants from being covered by the soil or otherwise injured in the cultivating operation. Such shield consists of an inverted angle shaped member, which has any suitable draft connection at its forward end with the cultivator unit.

The stabilizing means for the two outer cultivator units A and B comprises a transversely extending bar 51 which has pivotal connection with the cultivator units through forwardly extending arms 52. The front ends of the arms 52 have bearing support in the cultivator units A and B, in a manner which I shall hereinafter describe, and the rear ends of such arms are provided with upwardly extending bearing sockets (not shown) in which are swiveled clamping devices, indicated generally at 56. Each of such clamping devices comprises any suitable arrangement of cooperating clamping parts which rigidly engage around the end portion of the transverse stabilizing bar 51. The pivotal connection between each clamping device 56 and its arm 52 permits pivotal movement between said arm and the stabilizing bar when one or the other of the cultivator units swings inwardly or outwardly in following its lister row.

Referring to Fig. 2, the front end of each stabilizing arm 52 has a downwardly extending stem or bearing portion 53 which engages in a bearing socket 54 secured to the rear end of the channel shaped frame bar 10. Such bearing socket is preferably in the form of a depending sleeve having a flange 55 at its upper end which is secured to the under side of the frame bar. Such frame bar has an opening through which the bearing portion 53 extends in passing down through the bearing socket 54, and a pin 58 is passed transversely through the lower end of the bearing portion 53 to prevent upward displacement of the stabilizing arm from the bearing socket. The length of the bearing socket 54 affords a staunch pivotal support between the stabilizing arm and the frame of the cultivator unit, such being desirable because this pivotal support must resist the lateral tipping tendencies of the cultivator unit. Such pivotal support is additionally reenforced above the channel bar 10 by the cooperating bearing parts which I shall now describe. Secured to the upper side of the channel bar 10 is a bearing plate 59 which is centrally apertured to permit the bearing portion 53 to pass down therethrough. As shown in Figs. 6 and 7, such plate has its lateral edges 61 curved on arcs having the pivot axis of the bearing portion 53 as their center. Mounted on such bearing portion 53 above this plate is a cooperating bearing element in the form of a collar 62, such collar resting at its lower end on the plate 59. Extending radially from the collar 62 are bearing arms 63 which have hook-like ends 64 embracing the curved edges 61 of the plate 59. The extremity of each bearing arm 63 bears against the upper side of the plate 59, as indicated at 65, and also bears against the lower side of such plate, as indicated at 66. Extending rearwardly from the collar 62, and preferably at an elevated point above the bearing arm 63, is a clamping arm 67 in the upper side of which a longitudinal groove 68 is formed. The rearwardly extending portion of the stabilizing arm 52 engages in said groove, and is clamped therein by a U-bolt 69 which embraces the stabilizing arm and has its ends passing down through holes in the side portions of the clamping arm 67. The bearing arms 63 and the clamping arm 67 are reenforced by vertical ribs 71, which extend between these arms. It will be observed that the bearing plate 59 and bearing arms 63 supplement the bearing socket 54 in affording a staunch pivotal support which will resist the twisting stresses set up between the stabilizing arm and the cultivator unit, incident to any tipping tendency of the cultivator unit. The bearing surfaces 65 and 66 at the outer ends of both bearing arms 63, by virtue of being disposed at right angles to the pivot axis of the bearing and being spaced radially at a considerable distance from said axis, are very effective for resisting the twisting stresses incident to holding the cultivator unit against tipping. It will be noted that the bearing arms 63 also function as stops for limiting the lateral swinging movement of the stabilizing arm 52, such occurring when these bearing arms strike the angle brackets 72 which join the channel bar 10 with the transverse frame bar 11.

The stabilizing bar 51, in cross-connecting the two stabilizing arms 52 in the manner described, prevents either of these arms from twisting or tipping laterally about a longitudinal axis relative to its individual gang, and hence the arms and stabilizing bar hold the two gangs A and B against lateral tipping while still permitting said gangs to shift inwardly or outwardly in following their lister rows. Secured to the intermediate portion of the stabilizing bar 51 is the operator's seat 73, from which position the operator can conveniently reach the levers 34 and 44 of the three gangs. A bar 74 extends forwardly from the stabilizing bar 51, below the seat 73, and carries a foot rest 75 at its forward end. The seat 73 and foot rest 75 swing from side to side as a unit with the stabilizing bar 51 in any transverse shifting movement of said bar.

The arrangement of the two outer cultivator units A and B, and the general form of stabilizing connection between these units corresponds in general to a conventional two-row lister cultivator. Referring now to the operative association and connection of the intermediate cultivator gang C with the two outer gangs A and B, it will be seen from Fig. 1 that the intermediate gang is disposed considerably in rear of the transverse plane of the two outer gangs. Such location of the intermediate gang permits all three gangs to swing laterally in following the deviations in the plant rows without interference between the gangs; and also permits the implement to be turned at the ends of the field without the gangs colliding with each other in such turning movement. As previously remarked, the intermediate gang is in all material respects a duplicate of the outer gangs A and B, only differing therefrom in its draft connections. Referring to Fig. 1, such intermediate gang is provided with a pair of spaced draft members 76 which are pivotally connected to the lower ends of the yoke straps 26. The members 76 extend rearwardly beyond the yoke 26 and have pivotal connections with links (not shown) which extend down from the frame bar 10, which links, together with the yoke 26, afford a parallel link pivotal connection between the draft member 76 and the frame bar 10 of the intermediate unit. Such pivotal connection between the draft member 76 and the intermediate unit is illustrated and described in the co-pending application above referred to. The members 76 establish a draft connection for the intermediate cultivator unit in a manner which I shall presently describe.

The stabilizing means for this intermediate gang comprises a stabilizing bar or link 50 which extends diagonally forwardly from the intermediate unit to one end of the transverse stabilizing bar 51. The rear end of the diagonal stabilizing bar 50 has a downwardly extending bearing portion 60 which extends down into the vertical bearing socket 54 of the intermediate unit. The front end of the stabilizing bar 50 has a downwardly extending bearing portion 70 which has bearing engagement in a vertical bearing socket formed in a bracket 80 which is secured to the end of the transverse stabilizing bar 51. Thus the diagonal stabilizing bar 50 will hold the intermediate unit C against lateral tipping, without interfering with lateral shifting movement of such unit, such as is desirable in order that the unit be free to follow its lister row. In such lateral movement, the transverse stabilizing bar 51 will be shifted endwise to one side or the other on its freely swinging stabilizing arms 52.

The front ends of the draft members 76 have pivotal attachment to the center of a transversely extending bar 77. As shown in Fig. 2, this draft bar consists of two bars 77' of I-beam section which are riveted together at different points along their lengths to form a reenforced draft element. Adjacent to the center of the draft bar, such I-beams are separated to permit the interposition of a bearing block 79 between the same. This bearing block is swiveled on a pivot bolt 81 which passes vertically through the draft bars 77' and through the bearing block. The spaced draft members 76 extending forwardly from the intermediate cultivator unit are riveted or otherwise secured to the outer sides of the block 79. To either side of such block, spacing sleeves 82 are interposed between the upper and lower draft bars 77' to prevent binding of the pivot block 79, bolts 83 passing through the draft bars and through such spacing sleeves for holding the latter in place. It will be seen that pivotal connection between the draft member 76 and the draft bar 77 will permit the intermediate cultivator unit to swing laterally in either direction in following its lister row.

The transverse draft bar 77 lies below the frame bar 10 of each outer cultivator unit and has its ends terminating at points spaced outwardly from such frame bars. Referring to Fig. 2, the draft bar 77 has draft connection with each outer unit at a point directly below the frame bar 10 of such unit. Such draft connection comprises a guide opening 85 through which the draft bar extends and in which it can slide transversely. Two spaced plates 86 and 87 form the upper and lower sides of this guide opening, the forward ends of such plates being brought together and being secured to the draft pole 12 by the bolt 14. A reenforcing plate 88 is secured to the under side of the pole 12 by the bolt 14 and by another vertical bolt 89 which passes down through the rear end of the pole, the rear end of the reenforcing plate being bent upwardly and being secured to the under side of the frame channel 10. The rear end of the plate 86 has an aperture 91 which engages over the outside of the bearing socket 54 for reenforcing the attachment of such plate to the cultivator unit. The corresponding end of the lower plate 87 is bent upwardly and secured to the upper plate 86 by a bolt 92. The front and rear ends of the guide slot 85 are defined by rollers 93 and 94 which are pivotally supported between the upper and lower plates 86 and 87 on rivets or bolts 95 and 96. The upper end of the rivet or bolt 96 passes through the horizontal portion of a U-shaped reenforcing strap 97 which has its upper ends secured to the side flanges of the frame channel 10, this strap 97 reenforcing the attachment of the rear ends of the plates 86 and 87 to the cultivator unit. It will be seen from the foregoing that the draft bar 77 is free to slide endwise in the guide slot 85 while having a draft pull transmitted thereto from the cultivator unit, or conversely, while such draft bar is transmitting draft pull to the cultivator unit.

Referring to Fig. 1, the outer ends of the draft bars 77 are provided with holes 98 for effecting pivotal connection with the draft links 99 of two tripletrees 101. Each tripletree comprises the usual evener bar 102, to which singletrees 103 are pivotally connected, one in the center of said evener bar and the others at the outer ends thereof. It will be noted that the extension of the draft bar beyond the pole 12 of each outer gang disposes the tripletree 101 in such position that the three horses connected thereto will walk on the ridges between the lister rows, with the pole 12 extending between the inner pair of the three horses.

It will be seen from the foregoing that it adapt the implement to a four-horse hitch, as shown in Fig. 8, it is only necessary to couple the doubletrees 31 to the clevis members 28 of the two outer cultivator units. In this arrangement, the draft pull will be applied directly to the outer units A and B, and will thence be transmitted to the transversely extending draft bar 77 for advancing the intermediate unit. At such time, each outer unit will transmit its draft pull to the adjacent end portion of the draft bar 77 by the rear roller 94 engaging the rear side of the draft bar.

Conversely, when it is desired to adapt the implement to a six-horse hitch, it is only necessary to couple the tripletrees 101 to the outer ends of the draft bar 77. In this arrangement, the draft pull will be applied directly to the ends of the draft bar 77, and will thence be transmitted to the two outer units A and B. At such time, the draft car 77 will transmit its draft pull to each other outer cultivator unit by the front edge of the bar bearing against the front roller 93.

It will be noted that irrespective of whether the implement is arranged for a four-horse hitch or for a six-horse hitch, the draft bar and each outer cultivator unit are free to shift relatively to each other transversely of the implement—the draft bar sliding endwise between the rollers 93 and 94 so that all three cultivator units are capable of independent transverse shifting movement for following deviations in their lister rows.

What I claim as my invention and desire to secure by Letters Patent, is—

1. In a three-row lister cultivator, the combination of two outer cultivator units, an intermediate cultivator unit, each of said units having a forwardly extending member, a transversely extending draft bar, the forwardly extending member of said intermediate unit being coupled with the intermediate portion of said draft bar, means providing guide openings carried by said outer units underneath the forwardly extending members thereof and through which the end portions of said draft bar extend, said draft bar being slidable endwise in said openings, and means extending forwardly of said draft bar for coupling draft hitch devices to said outer units.

2. In a three-row lister cultivator, the combination of three lister cultivator units each comprising a frame, a wheel support, and cultivating devices, a transversely extending draft bar, means pivotally connecting the intermediate cultivator unit with the intermediate portion of said draft bar, the frame members of the two outer units having guide openings disposed in a plane spaced from the general plane of said frame members and providing means through which the end portions of said draft bar extend, and in which said draft bar can slide endwise, rollers associated with said guide openings for engaging the front and rear edges of said draft bar, and means for effecting draft coupling directly to said outer units and to the ends of said draft bar.

3. In a cultivator, two outer cultivator gangs and an inner gang, and draft means connected with said gangs and comprising means for effecting a six-horse hitch, said draft means also comprising means for effecting a draft hitch to the outer gangs for a four-horse hitch, said first named means being spaced outwardly of the last named means a distance sufficient to space the inner four of the draft animals for the six-horse hitch in substantially the same position as the four draft animals for the four-horse hitch.

4. In a cultivator, two outer cultivator gangs and an inner gang, a draft bar connecting the gangs and of a length whereby it is adapted for a six-horse hitch, said draft bar having means to which the six-horse hitch may be attached to position two draft animals on opposite sides of each of the outer rows, and means for effecting a draft connection to the outer gangs for a four-horse hitch, said last named means being arranged to also position two draft animals on opposite sides of each of the outer rows.

5. In a cultivator, the combination of two cultivator units, draft poles extending forwardly from the two units, a transversely extending draft bar, the units having guide openings, the end portions of the bar extending through said openings and projecting laterally beyond the units, said bar being slidable endwise through the openings, means for connecting doubletrees to each cultivator unit with the singletrees thereof disposed on opposite sides of said draft poles, and means for connecting tripletrees to the ends of said draft bar, said draft bar extending laterally beyond each unit so that the inner singletree of each tripletree is disposed on the inner side of the adjacent draft pole.

6. In a lister cultivator, the combination of two cultivator units adapted to follow plant rows, a draft bar extending transversely of said units and connected therewith, a draft tongue extending forwardly from each cultivator unit, said draft bar extending laterally beyond the tongues and provided with means for effecting a six-horse hitch in two groups of three draft animals each and so that two draft animals of each group are spaced on opposite sides of the tongue of the corresponding cultivator unit, and means connecting each cultivator unit with the corresponding tongue.

7. In a lister cultivator, the combination of a plurality of cultivator units, a transverse draft bar connected to said units, and means connecting said draft bar with the outer cultivator units so that the cultivator will be advanced in operation when draft power is applied to the draft bar and when draft power is applied to said outer cultivator units.

8. In a lister cultivator, the combination of a plurality of cultivator units including at least two outer units and an intermediate unit, a transverse draft bar connected to said units, means connecting the intermediate unit to the central portion of said draft bar, and means connecting said draft bar with the outer cultivator units to prevent relative fore and aft movement therebetween, so that the cultivator will be advanced in operation when draft power is applied to the draft bar and when draft power is applied to said outer units.

9. In a three-row lister cultivator, the combination of two outer cultivator units, each having supporting wheels and a forwardly extending draft pole, an intermediate cultivator unit, a transversely extending draft bar, said intermediate unit being coupled with the intermediate portion of said draft bar, means movably supporting the bar upon the draft poles of said outer units, said bar having portions extending outwardly laterally beyond said means, and means for coupling draft hitch devices to said outer portions of the draft bar.

10. In a lister cultivator, having two outer cultivator units and an intermediate cultivator unit, each of said outer units including a longitudinal member and links for transmitting draft directly to said outer units, the combination of a transverse draft bar connected with all of said units and extending outwardly beyond the longitudinal members of the outer gangs, and adapted to be connected with a source of draft.

11. In a lister cultivator having two gangs, each provided with a longitudinal member, downwardly extending wheel carrying standards connected with said member and having ground wheels thereon, a downwardly extending member, and draft transmitting means connected with the lower end of said downwardly extending member and said standards, the combination of a transverse draft bar, means supporting said bar below said longitudinal members in draft transmitting relation, and means providing for the attachment of draft means near the outer ends of said draft bar.

12. In a lister cultivator having two gangs, each provided with a longitudinal member, downwardly extending wheel carrying standards connected with said member and having ground wheels thereon, a downwardly extending member and draft links connecting said last named member with said standards, the combination of a transverse draft bar supported by the longitudinal members of said gangs and extending laterally outwardly beyond the latter, and means providing for the attachment of draft means near the outer ends of said draft bar.

13. In a lister cultivator having two gangs, each provided with a longitudinal member, downwardly extending wheel carrying standards connected with said member and having ground wheels thereon, a downwardly extending member, and draft transmitting means connected with the lower end of said downwardly extending member and said standards, the combination of a transverse draft bar, means supporting said bar below said longitudinal members substantially in the plane of the lower ends of said downwardly extending members in draft transmitting relation with respect to said longitudinal members, and means providing for the attachment of draft means near the outer ends of said draft bar.

14. In a lister cultivator having two outer gangs each provided with a longitudinal member, pivoted standards with ground wheels thereon, a downwardly extending lever pivoted on said member, draft links connecting said standards with said lever to transmit draft effort from said lever to said standards, and means locking said lever in fixed relation with said longitudinal member, the combination of a transverse draft bar supported by the longitudinal members of said gangs and extending laterally outwardly beyond the latter, and means providing for the attachment of draft means near the outer ends of said draft bar.

15. In a lister cultivator having two outer gangs each provided with a longitudinal member, pivoted standards with ground wheels thereon, a downwardly extending lever pivoted on said member, draft links connecting said standards with said lever to transmit draft effort from said lever to said standards, and means locking said lever in fixed relation with said longitudinal member, the combination of a transverse draft bar, means supporting said bar below said longitudinal members substantially in the plane of the forward ends of said draft links, and means providing for the attachment of draft means near the outer ends of said draft bar.

16. A lister cultivator comprising, in combination, a plurality of lister cultivator units, each having a frame and a longitudinally disposed pole, a transversely extending draft bar, means carried by said poles below the plane thereof and serving as guides through which the end portions of said draft bar extend, and means for effecting draft coupling with the outer ends of the draft bar.

17. A lister cultivator comprising, in combination, a plurality of lister cultivator units, each having a frame and longitudinally disposed pole, a transversely extending draft bar, means including a clip carried by each pole, said clips serving to receive the end portions of said draft bar, and means for effecting draft coupling with the outer ends of the draft bar.

18. In a three-row lister cultivator, the combination of two outer cultivator units, an intermediate cultivator unit, a transversely extending draft bar, means pivotally connecting the intermediate cultivator with the intermediate portion of said draft bar, the frame members of the two outer units having means forming guide openings through which the end portions of said draft bar extend, roller means associated with said guide openings for engaging one edge of said draft bar, and means for effecting draft coupling directly to said outer units and to the ends of said draft bar.

19. In a lister cultivator, having two outer cultivator units and an intermediate cultivator unit, each of said outer units including a frame, means for transmitting draft to the frames of the outer units, and means for transmitting draft therefrom to the intermediate unit comprising a transverse draft bar slidably supported upon the outer units and connected at its central portion with the intermediate unit.

WALTER H. SILVER.